Patented July 24, 1951

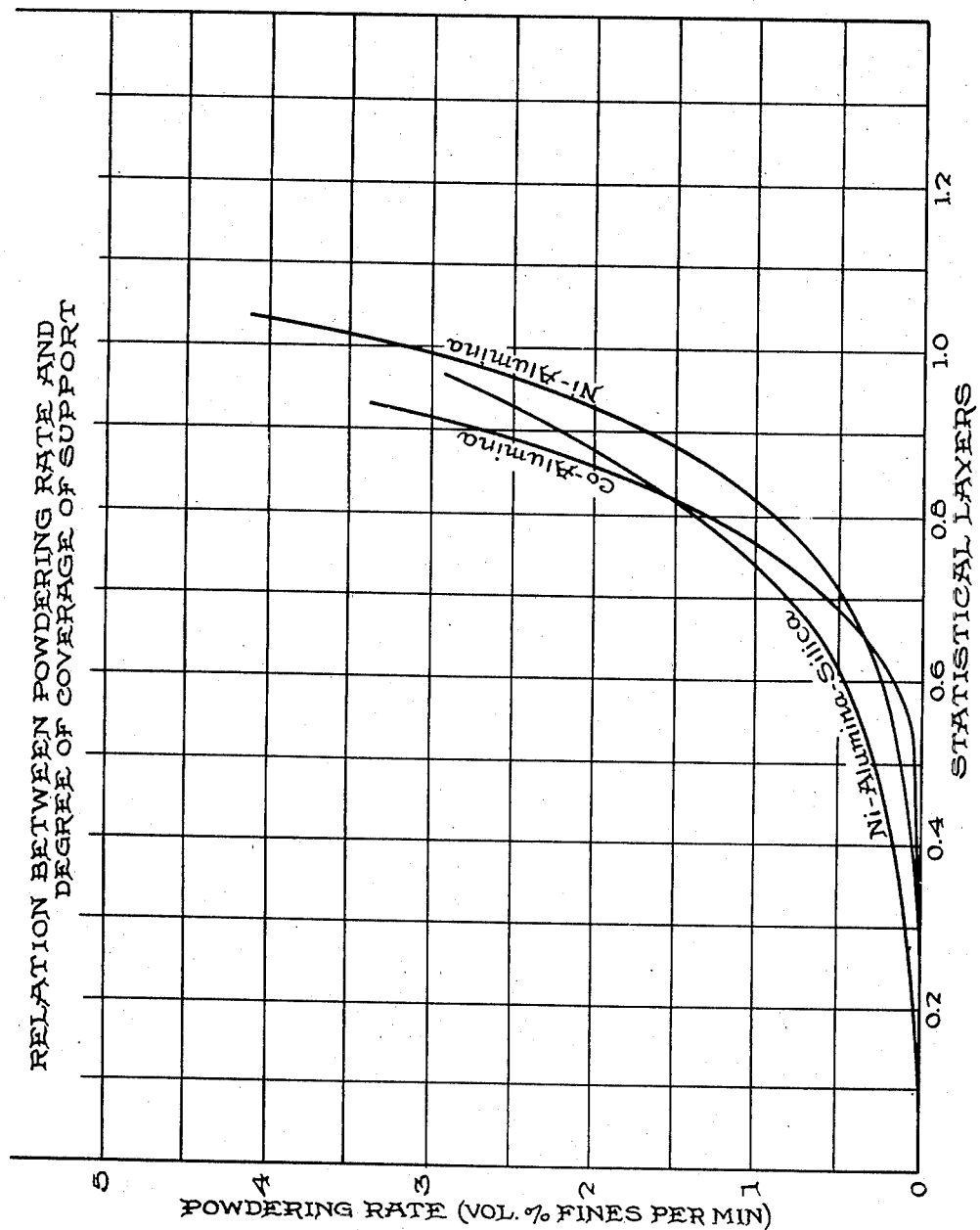

2,561,530

UNITED STATES PATENT OFFICE 2,561,530

LOW-PRESSURE HYDROGENATION PROCESS

Charles W. Montgomery, Oakmont, Pa., assignor to Gulf Research & Development Company, Pittsburgh, Pa., a corporation of Delaware Application November 19, 1948, Serial No. 61,037

9 Claims. (Cl. 196—30)

This invention relates to improved procedure for treating carbon compounds with hydrogen and in particular relates to improved procedure for the hydrodesulfurization of hydrocarbons.

Metals and metal oxides of the group VIII transition elements, i. e. iron, cobalt, nickel, ruthenium, rhodium, palladium, osmium, iridium and platinum have been used as contacts or catalysts for the treatment of organic substances with hydrogen. These materials have been employed either as metals or as oxides. It is common practice in employing these materials to mount them upon suitable porous supports, such as silica, alumina, aluminum silicates, etc. In this way the activity of the metal or metal oxide is enhanced and the tendency to sinter is reduced. However, serious difficulties have been encountered in the use of these catalysts or contacts due to their tendency to catalyze the deposition of carbon from carbon compounds being treated in the presence of hydrogen. Most of the group VIII transition group metals are capable of forming carbides, few of which are stable with respect to decomposition into carbon and free metal. As a result progressive carbon formation may take place during the treatment in the presence of hydrogen. While this is not particularly troublesome at hydrogen pressures above 2000 pounds, where carbon may be continuously removed by reduction to methane, it is of primary importance at hydrogen pressures between atmospheric and about 2000 pounds pressure.

The carbon deposited not only decreases the activity of the contact but also causes the contact to powder or decrepitate during use. Thus the carbon evidently enters the metal crystal lattice and tends to migrate into the interstices between the metal atoms where continued carbon formation exerts pressure and causes breaking up of the contact. The expansion during progressive carbon deposition on catalysts comprising the transition group elements is often so large as to result in very great increases in the bulk volume of the catalyst.

Ultimately, as carbon deposition progresses, the catalyst loses its original form and disintegrates to a finely divided powder which may more or less completely plug the catalyst or contact bed against the passage of the gases and vapors being treated. An excessive pressure drop across the bed results, which may necessitate shut-down of the process. This carbon powdering can occur with almost any type of supporting material and is even encountered with very hard refractory substances such as corundum, china clay and fire brick. Most hydrogenation processes in which these types of catalyst are used are of a cyclic nature, i. e., the on-stream reaction is intermittently terminated to regenerate the contact by burning off the carbon followed by re-use of the regenerated contact. In order for such a process to be economical it is necessary for the catalyst to be resistant to powdering over a long life, usually of at least several hundred cycles. The solution of this powdering problem is therefore of considerable economic importance.

This invention therefore has for its object the provision of a mild, i. e., low pressure, hydrogenation process utilizing a group VIII transition group metal or metal oxide on a porous carrier in which the foregoing difficulties are avoided to a substantial extent. Another object of the invention is to provide a low pressure hydrogenation process utilizing group VIII transition group metal or metal oxide catalysts or contacts over extended periods of time without extensive powdering of the catalyst or contact. A further object is to provide a low pressure hydrogenation procedure in which carbon formation and powdering of a group VIII transition group metal or metal oxide catalyst or contact is reduced. A still further object is to provide a process for hydrodesulfurization of sulfur-containing hydrocarbons, utilizing an iron group metal or oxide in which process carbon deposition and powdering of the catalyst or contact is markedly reduced. Other objects will appear hereinafter.

These and other objects are accomplished by my invention, which includes subjecting a carbon compound to treatment with hydrogen at a pressure below about 2000 p. s. i. g. in the presence of a group VIII transition metal or group VIII transition metal oxide on a porous support, the amount of metal or metal oxide and the surface area of the support being adjusted to result in less than approximately eight tenths of a statistical monolayer of said metal as either metal or metal oxide, distributed on the pore surface of the porous support. I have found, in accordance with my invention, that observance of these conditions results in a very great decrease in carbon deposition and a very great increase in the stability and life of the catalyst, i. e., the powdering of the catalyst or contact is greatly reduced.

It is believed that the susceptibility to carbon break-down, described above, increases with the degree of development of the metal crystal lattice on the surface of the porous support and that adjusting the amount of group VIII transition metal or metal oxide on the surface area of the contact, as described in the foregoing paragraph, evidently minimizes the metal crystal lattice development on the surface of the support. In any event the amount of carbon deposited and the powdering rate are decreased in accordance with my invention.

Qualitative confirmation of this general principle was obtained when two supported nickel oxide catalysts were prepared by impregnating an activated alumina of relatively low surface area (90 square meters per gram) and a silica gel of relatively high surface area (720 square meters per gram) with nickel nitrate solution so that after calcining the two catalysts contained approximately 25 and 31 per cent by weight nickel oxide, respectively. The resistance of these two catalysts toward carbon break-down was compared by passing a mixture of normal heptane and hydrogen in 1:1 molal ratio over the catalyst at 850° F., at atmospheric pressure and at a normal heptane liquid hourly space velocity of 2. Under these conditions the nickel oxide was rapidly reduced to nickel so that essentially the comparison was made between the supported metal catalysts. The experiments were continued until a pressure drop across the catalyst bed amounting to 6 inches of water had developed due to catalyst break-down and spalling as a result of carbon formation. This pressure drop was reached in 9 minutes of operation with the alumina catalyst and not until after 180 minutes with the silica gel catalyst. X-ray diffraction photographs were taken on fresh samples of the two catalysts, using identical exposure and developing technique. It was found that the nickel oxide pattern obtained with the alumina base catalyst was much more intense and sharp than that found with the silica gel catalyst, indicating a much more complete lattice development in the former case. This situation would also obtain after reduction.

This serves to indicate the fundamental method of the present invention, namely, the interrelation of the surface area of the supports with the amount of metal contained thereon, such that after impregnation with a solution of a salt of the transition group metal, followed by calcination (and reduction in the event the metal is used in the metallic form instead of the oxide form) the resulting low surface concentration of metal (or metal oxide) will not permit extensive development of metal crystal lattices on the supports. It has been found that the critical surface concentration of metal atoms corresponding to extensive development of metal crystal lattices coincides approximately with eight-tenths of a statistical monolayer of metal atoms (as either metal or metal oxide) on the supports. Only in rare cases would it be expected that impregnation would occur perfectly uniformly on a molecular scale. A certain degree of clustering or localized agglomeration or crystallization will aways take place on the surface of the pores of the support and this will probably vary somewhat with the conditions of impregnation. However, it has been found that the upper value of eight-tenths of a statistical monolayer is applicable to all methods of impregnation and all porous supports and will result in the benefits of the invention as described above.

The degree of coverage, i. e., the proportion of a statistical monolayer (determined as metal content) existing on the pore surface of the support may be calculated by the formula $$n = 2.09 \times 10^{20} \frac{w}{100-w} \frac{r^2}{MS}$$

where $n$ is the number of statistical layers on the support
$w$ is the weight per cent metal on the reduced catalyst
$r$ is the radius of the metal atom in centimeters
$M$ is the atomic weight of the metal
$S$ is the surface area of the support in square meters per gram (as determined by low temperature nitrogen adsorption, see for instance Brunauer, The Adsorption of Gases and Vapors, vol. I, Physical Adsorption—Princeton University Press, 1944, pages 285-299).

The nickel content of the alumina and silica catalysts in the above-described tests was 21 and 26 weight per cent respectively. Application of the above formula gives 1.62 and 0.268, respectively, for the statistical number of layers of nickel on the two catalysts. Thus, despite its slightly lower nickel content, the alumina catalyst has a surface concentration of nickel greatly in excess of that of the silica catalyst and also exceeding the critical surface concentration cited above.

The process is applicable to mild hydrogenation of carbon compounds in general, i. e., at pressure below about 2000 pounds. Such processes involve acute problems of carbon deposition and decrepitation of the catalyst or contact, as explained above. Examples of such processes are hydrocracking, hydrodesulfurization, Fischer-Tropsch, and hydrodemethylation especially under conditions such that the hydrodemethylation reaction tends to run away (see for instance U. S. Patent No. 2,470,712, dated May 17, 1949, in the names of C. W. Montgomery and W. A. Horne). The invention is of particular value in connection with the treatment of sulfur containing hydrocarbon vapors with hydrogen in order to remove sulfur compounds either by catalytic conversion into hydrogen sulfide or by absorption of the sulfur on the contact. In the latter case the contact is usually an iron group metal or metal oxide and is periodically regenerated by combustion to remove the sulfur in the form of sulfur dioxide and to reconvert the contact into the iron group metal oxide or the iron group metal (by reducing after the combustion). The invention is also of particular value in connection with the so-called Fischer-Tropsch process, wherein hydrocarbons are synthesized by catalytic reaction of carbon monoxide with hydrogen. In both of these processes, i. e. hydrodesulfurization and Fischer-Tropsch, the hydrogen pressures are relatively low and carbon formation and decrepitation of the catalyst or contact may be serious.

While the reaction conditions for the above-noted processes are not a part of this invention, the Fischer-Tropsch process in general utilizes a temperature between the range of about 360° and 675° F. The pressure may vary from about 1 atmosphere to about 30 atmospheres and the molal ratio of hydrogen to carbon monoxide in the synthesis gas mixture may vary between 3:1 and 1:2. In hydrodesulfurization a temperature of about 600° to 950° F. is employed, the lower temperatures being preferred for the lower boiling point hydrocarbons and the higher temperature for the higher boiling hydrocarbons. Hydrogen varying from about 100 to 4,000 or more cubic feet per barrel of liquid hydrocarbon is used and the pressure usually varies from 100 to 1000 p. s. i. g. In the specific form of desulfurization wherein the sulfur is absorbed on the contact it is customary to terminate the treatment of the sulfur containing hydrocarbon vapors when hydrogen sulfide appears in substantial amounts in the effluent. This corresponds to about 30 to 60 per cent conversion of the iron group metal or metal oxide into the sulfide. The contact is then regenerated by combustion and in the event that iron group metal is employed the combustion is followed by reduction. A space velocity of about 0.2 to 6.0 is generally employed in this process.

The contact should contain a sufficient amount of the group VIII transition metal or its oxide to catalyze the reaction or to absorb sulfur, etc., to the desired extent. In order to obtain a satisfactory rate of reaction it is usually preferable to use above 2 per cent by weight of the metal or metal oxide. The use of these larger amounts of the metal or metal oxide is especially desirable in the process wherein sulfur is removed by absorption on the iron group metal or oxide as described above. This type of process requires a considerable amount of metal or metal oxide to absorb the sulfur and to give a process cycle of reasonable length. I have indicated above that the amount of metal or metal oxide which is deposited on the porous support can be regulated by varying the amount of metal salt in the solution used for the impregnation. This is the simplest method but other methods such as multiple impregnation or impregnation from molten salts followed by leaching to the desired concentration will be evident to any chemist skilled in the preparation of catalysts.

It will be evident from the foregoing that there is an interrelation between the surface area of the support and the amount of metal contained thereon. If one wants to prepare a catalyst from a support having a high surface area, then a relatively large amount of metal may be deposited without exceeding the eight-tenths of a monolayer limit. But if a low surface area support is employed then relatively small amounts of metal should be deposited.

The porous carrier may be of any material having suitable surface area. Silica gel, alumina gel, activated alumina, silica-aluminas of the synthetic and natural varieties, magnesium and/or calcium silicates, etc., may be cited as examples.

Example 1

In the following table are given results of powdering tests of ten different nickel and cobalt catalysts prepared by impregnating two types of pelleted support (Activated Alumina and an alumina-silica cracking catalyst) with varying concentrations of the corresponding nitrates, drying and calcining in the usual manner. Tests were carried out with n-heptane and hydrogen as previously described except that the percentage of fines was measured by screening the catalyst after the tests. A standard volume of 50 cc. of catalyst was used and the duration of the test varied from 15 minutes to 6 hours, depending on the rapidity of powdering.

| Catalyst | | Wt. Per Cent Metal, $w$ | No. of Layers, $n$ | Powdering Rate (vol. per cent fines per min.) |
|---|---|---|---|---|
| Ni-Al$_2$O$_3$ | A | 4.45 | 0.284 | 0 |
| Do | B | 7.91 | 0.523 | 0.134 |
| Do | C | 11.25 | 0.772 | 0.746 |
| Do | D | 14.54 | 1.037 | 4.114 |
| Co-Al$_2$O$_3$ | A | 3.32 | 0.211 | 0.011 |
| Do | B | 7.43 | 0.493 | 0.033 |
| Do | C | 13.14 | 0.930 | 3.358 |
| Ni-Al$_2$O$_3$-SiO$_2$ | A | 5.6 | 0.191 | 0.022 |
| Do | B | 11.4 | 0.415 | 0.194 |
| Do | C | 23.1 | 0.969 | 2.926 |

These results are also shown graphically in the accompanying drawing from which the general desirability of limiting the surface coverage of the support to less than eight tenths of a statistical monolayer will be apparent.

Example 2

A semi-pilot plant scale aging test was conducted on two hydrodesulfurization contacts. The test consisted in passing total West Texas Crude admixed with 2000 cubic feet hydrogen per barrel of oil at a liquid hourly space velocity of 1.0 over a bed of contact maintained at 850° F. and 500 p. s. i. g. A process cycle of 4 hours was employed during which the crude was desulfurized and partially hydrocracked. This was followed by the regeneration cycle during which the sulfided contact was converted to the oxide and contact deposits were removed by controlled combustion with flue gas-air mixtures. The tests were carried out continuously for several hundred cycles. Periodically the reactor charges were dumped and the percentage fines was measured by screening. The two contacts consisted of 19 weight per cent nickel-on-alumina and 22 weight per cent nickel on a synthetic commercial alumina-silica cracking catalyst support. Surface coverage in the former case was calculated to be 1.084 layers, in the latter 0.778 layer. Both contacts performed satisfactorily with respect to hydrodesulfurization and hydrocracking but the powdering rate of the high surface coverage alumina contact was found to be 12.5 per cent fines per month while that of the alumina-silica, although it contained actually a larger amount of nickel, was only 3.6 per cent fines per month.

While I have found it convenient to describe my invention in connection with specific contacts it is applicable to all group VIII transition metals and their oxides.

What I claim is:

1. In the process of hydrogenating a carbon compound at a pressure which gives rise to carbon formation, while in the presence of hydrogen and while in the presence of a contact comprising essentially a member of the group consisting of transition group metals and their oxides distributed on a porous solid carrier which contact is subject to decrepitation during use in said process, the improvement which comprises reducing decrepitation of said contact by employing in said process a contact comprising essentially less than about eight tenths of a statistical monolayer of the transition group metal, as metal or metal oxide, substantially evenly distributed on the pore surface of said porous solid carrier, said statistical monolayer being determined on the basis of the metal content and being in accordance with the following formula:

$$n = 2.09 \times 10^{20} \frac{w}{100-w} \frac{r^2}{MS}$$

where n is the number of statistical layers on the support
w is the weight per cent metal on the reduced contact
r is the radius of the metal atom in centimeters
M is the atomic weight of the metal
S is the surface area of the support in square meters per gram (as determined in accordance with the low temperature nitrogen absorption method).

2. In the process of hydrogenating a carbon compound at a pressure below about 2000 p. s. i., which pressure gives rise to carbon formation, while in the presence of hydrogen and while in the presence of a contact comprising essentially a member of the group consisting of transition group metals and their oxides distributed on a porous solid carrier which contact is subject to decrepitation during use in said process, the improvement which comprises reducing decrepitation of said contact by employing in said process a contact comprising essentially less than about eight tenths of a statistical monolayer of the transition group metal, as metal or metal oxide, substantially evenly distributed on the pore surface of said porous solid carrier, said statistical monolayer being determined on the basis of the metal content and being in accordance with the following formula:

$$n = 2.09 \times 10^{20} \frac{w}{100-w} \frac{r^2}{MS}$$

where n is the number of statistical layers on the support
w is the weight per cent metal on the reduced contact
r is the radius of the metal atom in centimeters
M is the atomic weight of the metal
S is the surface area of the support in square meters per gram (as determined in accordance with the low temperature nitrogen absorption method).

3. In the process of hydrogenating a carbon compound at a pressure below about 2000 p. s. i., which pressure gives rise to carbon formation, while in the presence of hydrogen and while in the presence of a contact comprising essentially at least 2 per cent of a member of the group consisting of transition group metals and their oxides distributed on a porous solid carrier which contact is subject to decrepitation during use in said process, the improvement which comprises reducing decrepitation of said contact by employing in said process a contact comprising essentially less than about eight tenths of a statistical monolayer of the transition group metal, as metal or metal oxide, substantially evenly distributed on the pore surface of said porous solid carrier, said statistical monolayer being determined on the basis of the metal content and being in accordance with the following formula:

$$n = 2.09 \times 10^{20} \frac{w}{100-w} \frac{r^2}{MS}$$

where n is the number of statistical layers on the support
w is the weight per cent metal on the reduced contact
r is the radius of the metal atom in centimeters
M is the atomic weight of the metal
S is the surface area of the support in square meters per gram (as determined in accordance with the low temperature nitrogen absorption method).

4. In the process of desulfurizing a hydrocarbon at a pressure which gives rise to carbon formation, while in the presence of hydrogen, and while in the presence of a contact comprising essentially a member of the group consisting of the transition group metals and their oxides distributed on a porous solid carrier which contact is subject to decrepitation during use, the improvement which comprises reducing decrepitation of said contact by employing in said process a contact comprising essentially less than about eight tenths of a statistical monolayer of the transition group metal, as metal or metal oxide, substantially evenly distributed on the pore surface of said porous solid carrier, said statistical monolayer being determined on the basis of the metal content and being in accordance with the following formula:

$$n = 2.09 \times 10^{20} \frac{w}{100-w} \frac{r^2}{MS}$$

where n is the number of statistical layers on the support
w is the weight per cent metal on the reduced contact
r is the radius of the metal atom in centimeters
M is the atomic weight of the metal
S is the surface area of the support in square meters per gram (as determined in accordance with the low temperature nitrogen absorption method).

5. In the process of desulfurizing a hydrocarbon at a pressure below about 1000 p. s. i., which pressure gives rise to carbon formation, while in the presence of hydrogen, and while in the presence of a contact comprising essentially at least 2 per cent of a member of the group consisting of the transition group metals and their oxides distributed on a porous solid carrier which contact is subject to decrepitation during use, the improvement which comprises reducing decrepitation of said contact by employing in said process a contact comprising essentially less than about eight tenths of a statistical monolayer of the transition group metal, as metal or metal oxide, substantially evenly distributed on the pore surface of said porous solid carrier, said statistical monolayer being determined on the basis of the metal content and being in accordance with the following formula:

$$n = 2.09 \times 10^{20} \frac{w}{100-w} \frac{r^2}{MS}$$

where n is the number of statistical layers on the support
w is the weight per cent metal on the reduced contact
r is the radius of the metal atom in centimeters
M is the atomic weight of the metal
S is the surface area of the support in square meters per gram (as determined in accordance with the low temperature nitrogen absorption method).

6. In the process of desulfurizing a hydrocarbon at a pressure below about 1000 p. s. i., which pressure gives rise to carbon formation, while in the presence of hydrogen, and while in the presence of a contact comprising essentially at least 2 per cent of an iron group metal oxide distributed on a porous solid carrier which contact is subject to decrepitation during use, the improvement which comprises reducing decrepitation of said contact by employing in said process a contact comprising essentially less than about eight tenths of a statistical monolayer of the iron group metal oxide substantially evenly distributed on the pore surface of said porous solid carrier, said statistical monolayer being determined on the basis of the metal content and being in accordance with the following formula:

$$n = 2.09 \times 10^{20} \frac{w}{100-w} \frac{r^2}{MS}$$

where $n$ is the number of statistical layers on the support $w$ is the weight per cent iron group metal on the reduced contact $r$ is the radius of the iron group metal atom in centimeters $M$ is the atomic weight of the iron group metal $S$ is the surface area of the support in square meters per gram (as determined in accordance with the low temperature nitrogen absorption method).

7. In the process of desulfurizing a hydrocarbon at a pressure below about 1000 p. s. i., which pressure gives rise to carbon formation, while in the presence of hydrogen, and while in the presence of a contact comprising essentially at least 2 per cent of an iron group metal distributed on a porous solid carrier which contact is subject to decrepitation during use, the improvement which comprises reducing decrepitation of said contact by employing in said process a contact comprising essentially less than about eight tenths of a statistical monolayer of the iron group metal substantially evenly distributed on the pore surface of said porous solid carrier, said statistical monolayer being determined in accordance with the following formula:

$$n = 2.09 \times 10^{20} \frac{w}{100-w} \frac{r^2}{MS}$$

where $n$ is the number of statistical layers on the support $w$ is the weight per cent iron group metal on the reduced contact $r$ is the radius of the iron group metal atom in centimeters $M$ is the atomic weight of the iron group metal $S$ is the surface area of the support in square meters per gram (as determined in accordance with the low temperature nitrogen absorption method).

8. In the process of desulfurizing a hydrocarbon at a pressure below about 1000 p. s. i., which pressure gives rise to carbon formation, while in the presence of hydrogen, and while in the presence of a contact comprising essentially at least 2 per cent of nickel oxide distributed on a porous solid carrier which contact is subject to decrepitation during use, the improvement which comprises reducing decrepitation of said contact by employing in said process a contact comprising essentially less than about eight tenths of a statistical monolayer of the nickel oxide substantially evenly distributed on the pore surface of said porous solid carrier, said statistical monolayer being determined on the basis of the metal content and being in accordance with the following formula:

$$n = 2.09 \times 10^{20} \frac{w}{100-w} \frac{r^2}{MS}$$

where $n$ is the number of statistical layers on the support $w$ is the weight per cent nickel on the reduced contact $r$ is the radius of the nickel atom in centimeters $M$ is the atomic weight of nickel $S$ is the surface area of the support in square meters per gram (as determined in accordance with the low temperature nitrogen absorption method).

9. In the process of desulfurizing a hydrocarbon at a pressure below about 1000 p. s. i., which pressure gives rise to carbon formation, while in the presence of hydrogen, and while in the presence of a contact comprising essentially at least 2 per cent nickel distributed on a porous solid carrier which contact is subject to decrepitation during use, the improvement which comprises reducing decrepitation of said contact by employing in said process a contact comprising essentially less than about eight tenths of a statistical monolayer of the nickel substantially evenly distributed on the pore surface of said porous solid carrier, said statistical monolayer being determined in accordance with the following formula:

$$n = 2.09 \times 10^{20} \frac{w}{100-w} \frac{r^2}{MS}$$

where $n$ is the number of statistical layers on the support $w$ is the weight per cent nickel on the reduced contact $r$ is the radius of the nickel atom in centimeters $M$ is the atomic weight of the nickel $S$ is the surface area of the support in square meters per gram (as determined in accordance with the low temperature nitrogen absorption method).

CHARLES W. MONTGOMERY.

REFERENCES CITED

The following references are of record in the file of this patent:

UNITED STATES PATENTS

| Number | Name | Date |
|---|---|---|
| 2,159,281 | Marecaux | May 23, 1939 |

OTHER REFERENCES

Berkman: Catalysis (Reinhold Publ.), 1940, pages 451–482.